United States Patent [19]
Kostick

[11] Patent Number: 5,961,359
[45] Date of Patent: Oct. 5, 1999

[54] METHOD AND DEVICE FOR DISMANTLING CATHODE RAY TUBES FOR RECYCLING

[76] Inventor: Joseph Kostick, 302 Murray St., Rahway, N.J. 07065

[21] Appl. No.: 09/059,832

[22] Filed: Apr. 14, 1998

[51] Int. Cl.⁶ ...................................................... B02C 1/00
[52] U.S. Cl. ................................................ 445/2; 445/61
[58] Field of Search .................................................. 445/2

[56] References Cited

U.S. PATENT DOCUMENTS

| | | | |
|---|---|---|---|
| 3,981,554 | 9/1976 | Todd | 316/1 |
| 3,997,311 | 12/1976 | Rogers | 65/28 |
| 4,952,185 | 8/1990 | Lee | 445/2 |
| 5,316,510 | 5/1994 | Muhlberger et al. | 445/2 |
| 5,352,142 | 10/1994 | Wolf | 445/2 |
| 5,556,018 | 9/1996 | Kanehira | 225/2 |

FOREIGN PATENT DOCUMENTS 4314013  12/1994  Germany .

*Primary Examiner*—Kenneth J. Ramsey
*Attorney, Agent, or Firm*—Mary A. Whiting

[57] ABSTRACT

The present invention relates to a method and/or device wherein a cathode ray tube (CRT) is dismantled into components, in a relatively dust free and safe environment, utilizing an energy efficient method, creating an end product of crushed leaded glass, leaded dust, nickel containing material and steel in a form suitable for recycling. The present invention is especially useful in lieu of discarding or landfilling CRTs, since the leaded glass of CRTs has been regulated and classified as a "regulated hazardous waste" accordingly to recent United States government land ban regulations, and are therefore banned from landfilling. The present invention is further concerned with a device for performing the method of the present invention, said device comprising: a dismantling unit for separating external components of the CRT from the CRT body; a crushing unit with crushing means for separating the glass components from the metal components; a vacuum unit with vacuum means for collecting dust created during the method of the invention. In the preferred embodiment of the invention, the floor of the crushing unit is slotted, whereby the pieces of crushed glass fall into the shipping container, and the metal components remain on the slotted floor. Thus minimizing the handling of the crushed glass. This causes minimal handling of the recyclable end products. Also, the vacuum condition created by the present invention creates ensures that exposure to leaded dust is minimal, safe and captures leaded dust for recycling.

19 Claims, 3 Drawing Sheets

METHOD AND DEVICE FOR DISMANTLING CATHODE RAY TUBES FOR RECYCLING

BACKGROUND—FIELD OF INVENTION

Cathode ray tubes (CRTs) are used predominantly for computer display screens and television screens. A CRT is composed of a glass neck, funnel, and face panel as well as various metal components, including an external steel mounting ring, an internal steel screen, and an internal steel and nickel composed gun. The primary concerns centering around the disposal of CRTs are environmental and safety concerns. The disposal of CRTs is problematic due to leaded glass and other components. Leaching of the lead into landfills, the depletion of available landfill space, and the regulatory ban on landfilling regulated materials, creates the need for recycling the components of CRTs as an alternative to landfill disposal. The lead content of CRTs is contained in the glass components, which should be disposed of properly. The steel mounting ring and screen may also be recycled, as may the steel and nickel containing gun. Utilizing the device and/or method of the present invention, the leaded glass, leaded dust, and the nickel and steel containing components, are separated and prepared in a form suitable for recycling. The present invention also allows for the leaded glass end product, since it is usefully employed in ore smelting, to be exempted from governmental regulations as a classified "regulated solid waste."

BACKGROUND—DESCRIPTION OF THE PRIOR ART

The present invention relates to a method and/or device wherein a cathode ray tube (CRT) is dismantled into components suitable for recycling.

Heretofore, CRT dismantling methods have been costly, not energy efficient, complicated and/or necessitate the utilization of additional chemicals. The present invention overcomes these obstacles by teaching a device and/or method which is safe, energy efficient, and simple in construction and process.

Prior art devices which are concerned with crushing and/or dismantling of CRTs are exemplified by the following U.S. Pat. Nos.:

| Kanehira | U.S. Pat. No. : 5,556,018 | September 17, 1996 |
| Wolf | U.S. Pat. No. : 5,352,142 | October 4, 1994 |
| Mulberger | U.S. Pat. No. : 5,316,510 | May 31, 1994 |
| Lee | U.S. Pat. No. : 4,952,185 | August 28, 1990 |
| Antonucci | U.S. Pat. No. : 4,176,891 | December 4, 1979 |
| Todd | U.S. Pat. No. : 3,391,554 | September 21, 1976 |
| Rogers | U.S. Pat. No. : 3,997,311 | December 14, 1976 |

U.S. Pat. No. : 5,556,018, issued to Kanehira on Sep. 17, 1996, discloses a method and apparatus utilizing heat for splitting a CRT for salvaging. The present invention is safer, and more energy efficient than Kanehira, since heat is not utilized in it's method. Also, the present invention produces a recyclable end U.S. Pat. No. : 5,352,142, issued to Wolf on Oct. 4, 1994, discloses a method of reprocessing picture tubes utilizing heat for salvaging. The present invention is more energy efficient than Wolf, since heat is not utilized in it's method. Also, the present invention produces a recyclable end product.

U.S. Pat. No. : 5,316,510, issued to Muhlberger et. al., on May 31, 1994, discloses a method and device for crushing the glass of tubes and then cleaning the glass with water for an end product of crushed glass for recycling. The present invention is distinguished from Muhlberger et. al., since a vacuum for creating a dust free environment is employed, and no bath is required.

U.S. Pat. No. : 4,952,185, issued to Lee on Aug. 28, 1990, discloses a separation of components of CRTs for salvaging. No acid bath is employed in the present invention. Therefore, the present invention is safer and more energy efficient than Lee, and produces a recyclable end product.

U.S. Pat. No. : 4,176,891, issued to Antonucci et. al., on Dec. 4, 1979, discloses separation of the components of CRTs utilizing an acid bath and thermal block for salvaging. No acid bath or thermal block is employed in the present invention. Therefore, the present invention safer and more energy efficient and produces a recyclable end product.

U.S. Pat. No. : 3,391,554, issued to Todd on Sep. 21, 1976, discloses a method of air letting an evacuated cathode ray tube, for dismantling, when the pressure of the gas inside the chamber is equal to the atmospheric pressure. Todd is not concerned with the recycling of the tube components. Therefore, the present invention is distinguishable from Todd since it employs a safe and more efficient dismantling process and produces a recyclable end product.

U.S. Pat. No. : 3,997,311, issued to Rogers on Dec. 14, 1976, discloses a method for separating the faceplate from the funnel of the CRTs. The present invention is distinguished from Rogers since the end product of Rogers are CRT components for salvaging not recycling. Rogers does not employ crushing the CRT into recyclable pieces.

German Patent No.: DE 43 14 013 A1, dated Nov. 3, 1994, discloses a device for separating and breaking up of picture tubes, using mechanical, heat and vacuum methods. The present invention can be distinguished from the German invention since the present invention does not employ heat, making it safer and more energy efficient. Also, the vacuum employed in the present invention is employed throughout the process, rather than for solely for vacuuming the screen surface, as it is employed in the German invention. Also, no lead reclamation is addressed in the German patent.

None of the above-referenced references show a device which employs a method for separating CRTs into components which create easily recyclable leaded glass and leaded dust, as well as nickel containing material and steel end product, in a relatively dust free, safe and energy efficient environment.

OBJECTS OF THE INVENTION

Accordingly, it is the principle object of the present invention to be able to disassemble CRTs into their component parts, in a relatively dust free and safe environment, utilizing an energy efficient method, creating an end product of crushed leaded glass, leaded dust, nickel containing material and steel in a form suitable for recycling.

It is a further object of the present invention to create an efficient, safe method whereby the leaded glass and leaded dust is produced as an end product in a shipping-ready package. Since no further handling of the leaded end product is required after leaving the apparatus, the operation is safe as it minimizes the lead exposure to the handler.

It is a further object of the invention to create an end product of leaded crushed glass and leaded dust whereby the end product is recyclable, which eliminates the production of leaded materials with the potential of leaching into landfills, thus minimizing the amount of leaded materials entering landfills.

It is a further object of the present invention to create an end product which is recyclable, thus avoiding regulation and classification by United States governmental environmental agencies as a regulated substance.

It is a further object of the present invention to create an end product which can be easily separated into shipment-ready containers.

Figure 1:
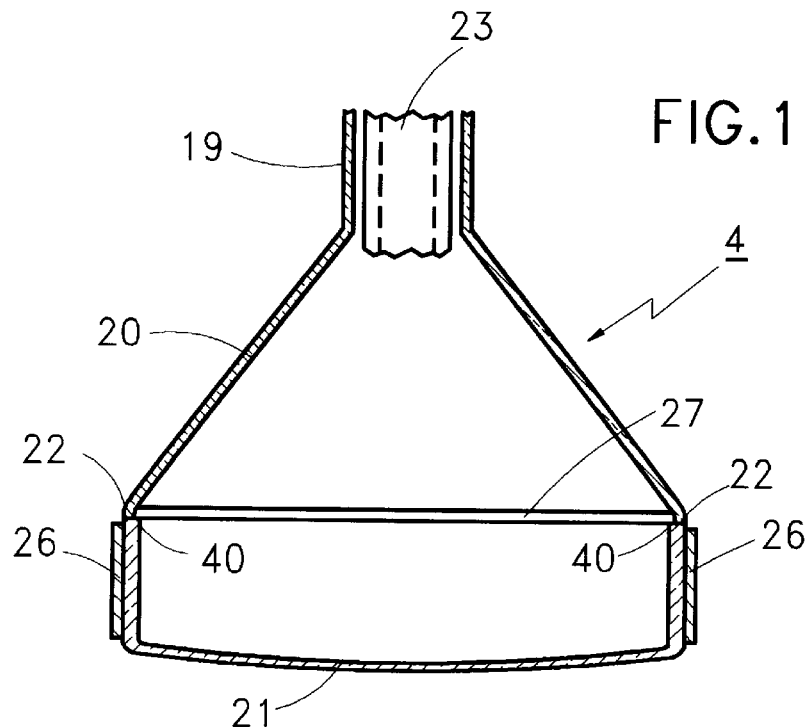
FIG. 1. illustrates a sectional plan view of the CRT.

REFERENCE NUMBERS IN THE DRAWINGS 1. dismantling unit light
2. dismantling unit
3. open chamber
4. CRT body
5. hose
6. dust collector unit
7. cyclone unit
8. filter unit
9. hose
10. blower
11. vacuum power motor
12. dust collector bag
13. hydraulic power motor
14. crushing unit
15. crushing chamber
16. hydraulic piston
17. crushing chamber door
18. crushing chamber lock
19. CRT neck
20. CRT funnel
21. CRT face panel
22. CRT frit seal linear surface
23. CRT gun
24. crushing unit light
25. dismantling unit hose vent
26. CRT mounting ring
27. CRT screen
28. slotted floor of crushing chamber
29. hose vents of crushing unit
30. hose
31. hose vent wall in crushing chamber
32. hose vent screen in crushing chamber
33. receiving container
34. hose vent wall in dismantling unit
35. lever
36. receiving bin door
37. receiving bin lock
38. dual hydraulic hose
39. ridged ceiling of crushing chamber
40. internal surface edge of CRT face panel
41. safety lock device
42. hinged safety support device
43. chain of hinged safety support device
44. hinge of safety support device
45. hydraulic means switch
46. vacuum means switch
47. filter unit stand
48. hose vent screen in dismantling unit

SUMMARY OF THE INVENTION

The method for dismantling CRTS, in a safe and dust free environment, in order to create an end product of glass, dust, and metal components, in a form which is suitable for shipping to recyclers, comprising the steps of:

manually placing a CRT, comprising a glass body, including neck, funnel, and face panel portions, with external steel mounting ring, and internal steel screen, and a steel and nickel containing gun, in the open chamber of the dismantling unit;

manually dismantling the external mounting ring from the CRT;

manually placing the separated external mounting ring in a container for recycling;

simultaneously while the above steps are practiced, the dust created during dismantling is vacuumed and collected into a collector for recycling;

manually placing the CRT with external mounting ring removed on the slotted floor of the crushing chamber of the crushing unit;

breaking the glass of the CRT's neck in order to manually dismantle the gun from the CRT;

manually placing the gun in a container for recycling;

closing and locking the crushing unit, in order to safely crush the CRT components by hydraulic press means;

during the operation of the hydraulic press means, when activated to maximum crushing position, the ridged ceiling of the unit meets and fits into the slotted floor of the unit; whereby the glass components fall through the slotted floor of the crushing unit, and are therefore separated from the internal metal screen component, which remains on the surface of the slotted floor of the crushing unit;

collecting the crushed glass which falls through the slotted floor into a receiving container for recycling;

returning the ceiling to its original position by hydraulic press means; thus enabling the operator to open the unit and gain access to the chamber of the crushing unit;

manually placing the screen from the surface of the slotted floor into a container for recycling;

simultaneously while the above steps are practiced, the dust created during crushing is vacuumed and collected into a bag for recycling, and manually placing the dust collected during the above steps into the receiving container containing the crushed glass for recycling.

The method of the present invention is especially useful in lieu of discarding or landfilling CRT's, since the leaded glass of CRTs has been regulated as a "regulated hazardous waste" accordingly to recent United States government land ban regulations, and are therefore banned from landfilling. In addition, the recycling of the CRT components, and an alternative to landfilling, saves the CRTs from taking up valuable landfill space, which is being depleted. The landfills are therefore relieved of debris.

In the preferred embodiment of the invention, the steel comprised components of the CRT, the mounting ring and screen, are suitable for recycling. The gun contains nickel and steel suitable for recycling. The neck, funnel, face panel and dust created are composed of leaded glass, which is also suitable for recycling.

The present invention is further concerned with a device for performing the method of the present invention, said device comprising:

a dismantling unit for manually separating the external mounting ring from the CRT body;

a crushing unit with door for separating the glass components from the screen and gun components;

a hydraulic means for crushing the CRT in the crushing chamber of the crushing unit, said means connected to said crushing unit;

a filter unit for simultaneously collecting dust created during the method of the invention into a dust collector unit;

vacuum hoses between the dismantling, crushing and filter units, which connect to vents in the crushing and dismantling units, through which the dust travels to be ultimately deposited in a bag in the collector unit, and a means for creating a vacuum to collect dust in the filter unit.

Optional safety devices of the invention include: a locking device to ensure the hydraulic operation is operational only when the door of the crushing unit is closed, and a hinged safety support device to obstruct and stop the ridged ceiling from moving towards the slotted door when the door of the crushing unit is open.

In the preferred embodiment of the invention, the floor of the crushing chamber is slotted and stationary, while the ceiling is ridged and moveable. Whereby during hydraulic operation, at maximum crushing position, the floor and ceiling fit into each other. The pieces of crushed glass fall into the receiving container, and the screen remains behind on the surface of the slotted floor. There is also a screen in front of the wall containing the hose vents, in order to stop larger than dust sized particles from entering the hose vent during vacuum conditions. In the preferred embodiment of the invention a plurality of hose vents, preferably three, are located on the back wall of the crushing chamber behind the screen. Only one hose vent, also with screen, is preferred for the dismantling unit. Also, in the preferred embodiment of the invention, a safety lock device, engages and closes the electrical circuit between the hydraulic means and safety lock device, when the door of the crushing unit is closed. When the door of the crushing unit is open, the electrical circuit is broken, and the invention is inoperable. A hinged safety support device manually positions at an approximate 45 degree angle to the hinged edge of the door of the crushing unit, directly beneath the ridged ceiling, when the door is opened; thus obstructing the ridged ceiling from moving towards the slotted floor when the door is opened.

DESCRIPTION OF THE PREFERRED EMBODIMENT OF THE INVENTION

The present invention will now be described in detail with the aid of the several specific embodiments in utilizing FIGS. 1–4.

The CRT is represented in FIG. 1, comprising a body 4, having a glass neck 19, funnel 20 and face panel 21. The funnel 20 and face panel 21 are frit sealed together, at linear surface 22, as is conventional in the art. The thickness of funnel 20 is slightly thinner than the thickness of face panel 21; thus creating an internal surface edge 40. A steel mounting ring 26 is located externally. The nickel and steel gun 23, is internally located in the neck 19. The internal screen 27 is located parallel to the face panel 21, and rests upon the exposed internal surface edge 40 of the face panel 21.

Figure 3:
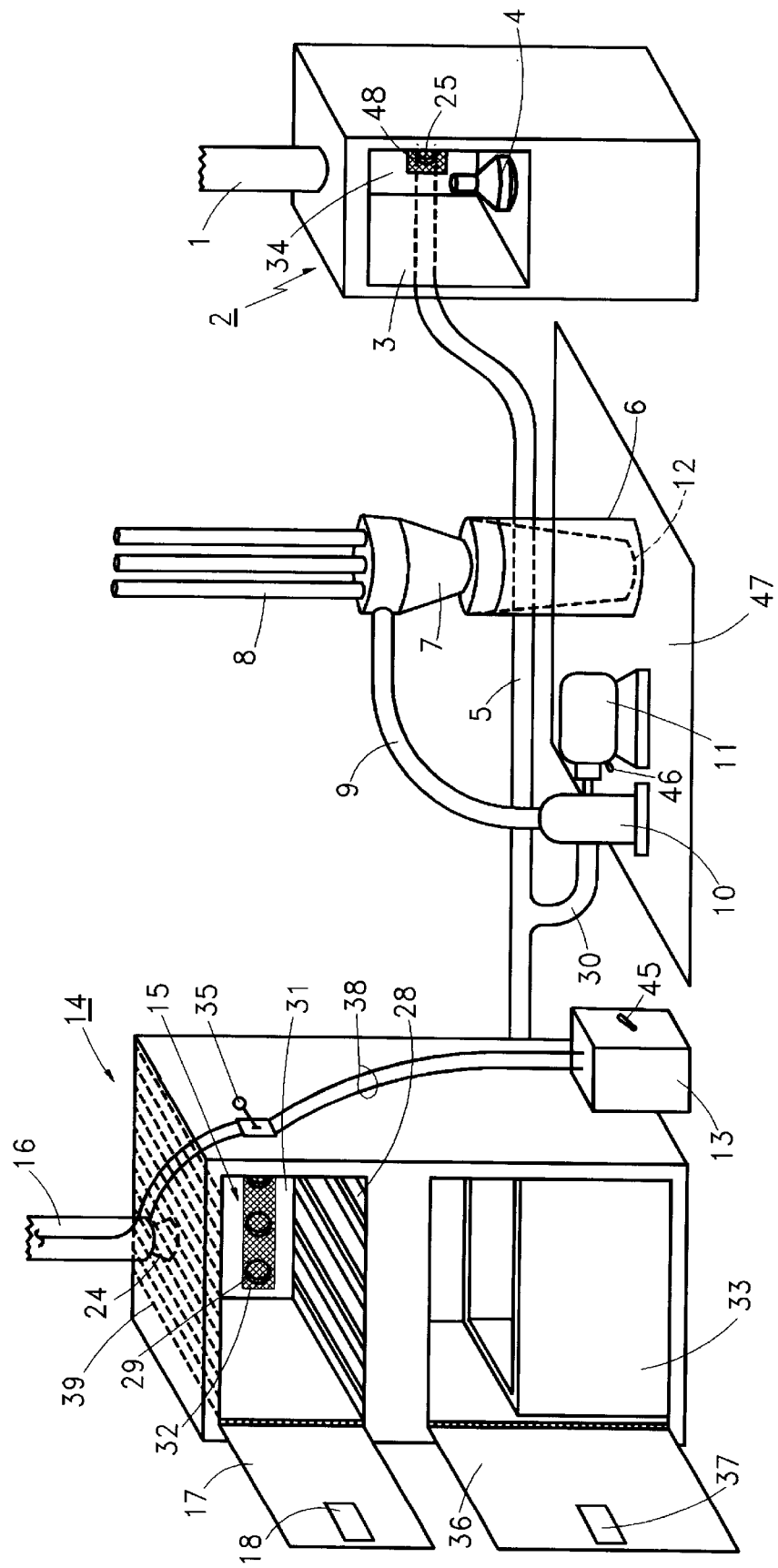
FIG. 3. illustrates a perspective view of the invention, showing the connection of the apparatus parts, with doors open.

As shown in FIG. 3, the CRT body 4 is manually placed in the open chamber 3 of the dismantling unit 2, where the CRT body 4 is broken in order to separate and remove the external mounting ring 26 from the CRT body 4. The external mounting ring 26 is placed into a container to be recycled for its stainless steel content. Illumination of the dismantling chamber is provided by light 1.

Simultaneously while the above steps are practiced, the dust created during manual dismantling is vacuumed and collected for recycling. Dust created during the dismantling of the external mounting ring 26 is vacuumed through hose vent screen 48, through hose vent 25, located in the wall 34 furthest from the operator of open chamber 3, through hose 5, through hose 30, which is connected to the blower unit 10, through hose 9, into filter unit 8 of cyclone unit 7, into dust collector bag 12 of dust collector unit 6. The vacuum is powered by motor 11, which is turned on and off by conventional switch 46. Stand 47 stabilizes the filter unit's and vacuum means operation.

Figure 2:
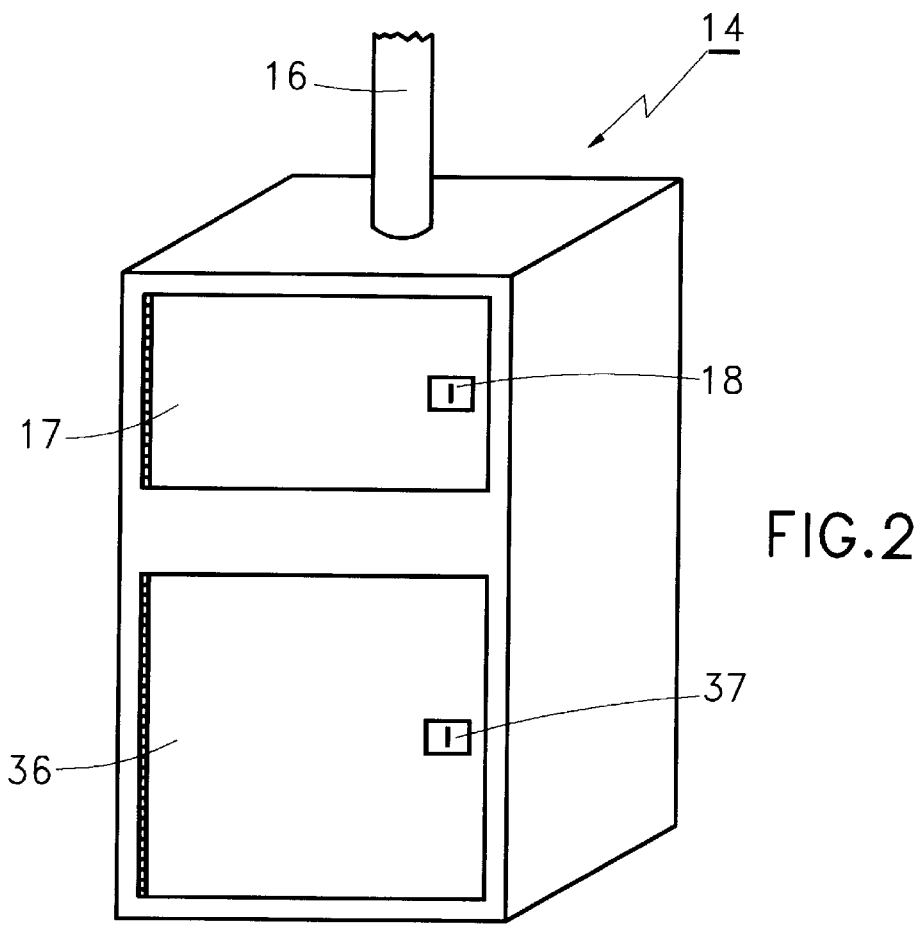
FIG. 2. illustrates a perspective view of the crushing unit of the invention, with doors closed.
Figure 4:
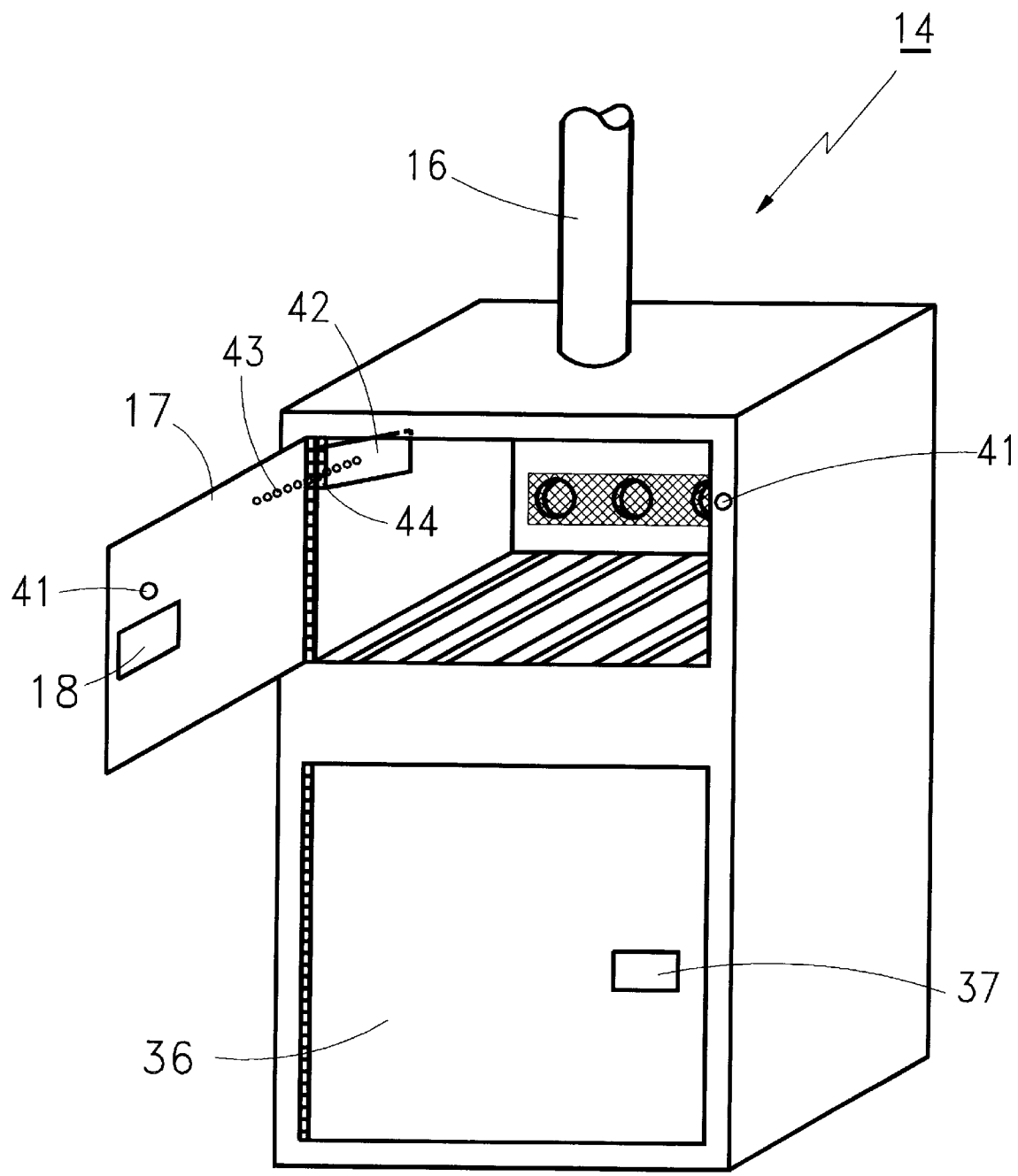
FIG. 4. illustrates a perspective view of the crushing unit of the invention with receiving bin door closed, and crushing chamber door open, showing the optional safety lock and hinged safety support devices.

Once the external mounting ring 26 is removed, the CRT body 4, is manually placed in the crushing chamber 15 of the crushing unit 14, where the CRT body 4 is further manually broken, at the neck 19, to remove the internal gun 23. Crushed glass components of the CRT body 4 fall through the slotted floor 28 of the crushing unit 14 into a receiving container 33 for recycling. The gun 23 is manually placed into a container to be recycled for its steel and nickel content. As shown in FIG. 2, doors 36 and 17 of the crushing unit 14 are then manually closed. As shown in FIG. 3, the hydraulic piston means 16, is powered by pump 13, which is turned on and off by conventional switch 45, and controlled by lever 35. As shown in FIG. 4, an optional safety feature, safety lock device 41, opens or closes the circuit which exists between safety lock device 41, hydraulic pump 13, and lever 35. The circuit is broken when the safety lock device 41 is disengaged, when door 17 is opened, and the circuit is closed when the safety lock device 41 is engaged when the door 17 is closed. Manually opening door 17 by unlocking lock 18 will automatically cause safety lock device 41 to disengage and open the circuit, thus stopping the invention's operation. As shown in FIG. 3, the moveable ridged ceiling 39 fits into fixed slotted floor 28, at the maximum crushing position of the invention. Movement of the ridged ceiling 39 is driven by conventional hydraulic fluids through dual hydraulic hose 38. Movement of the ridged ceiling 39 downward and towards the slotted floor 28, is controlled by the operator moving lever 35 to the forward position; moving lever 35 to the reverse position will cause ridged ceiling 39 to move upward and away from the slotted floor 28, and towards its original position. The glass components (neck 19, face panel 21, and funnel 20) and metal components (screen 27) of the CRT body 4 are crushed into components suitable for recycling. The glass components (the neck 19, face panel 21, and funnel 20,) fall through slotted floor 28 into a receiving container 33, while the screen 27 remains on the slotted floor 28. Hose vent screen 32 is located on wall 31, in front of hose vent 29, in order to stop larger than dust sized particles from entering the hose vent 29. The CRT screen 27 is manually removed from the slotted floor 28 and placed in a container to be recycled for its steel content.

As shown in FIGS. 2 and 3, when the unit is operational, doors 17 and 36 are closed and locked, thus ensuring the safety of the operator and a relatively dust free environment outside the crushing unit 14. Once the initial position of the ridged ceiling 39 is attained, the movement of the ceiling 39 is stopped by moving lever 35 to the stop position. The source of electrical power for the circuit is manually turned on and off by conventional switch means 45. The manual opening of door 17 by opening lock 18 disengages safety lock 41. Door 36 and lock 37 can also be manually opened and unlocked, respectively, by the operator.

As further illustrated in FIG. 4, an optional hinged support device 42 enables ridged ceiling 39 not to fall or move towards the slotted floor 28 when door 17 is opened. Support device 42 is attached to door 17 by hinge 44. When door 17 is opened, chain 43 becomes taut and support device 42 is pulled into an approximate forty-five degree angle position to the hinge 44, beneath the ridged ceiling 39 in order to support and obstruct any downward movement of the ridged ceiling 39.

As further shown in FIG. 3, dust created during the crushing stage is vacuumed through the plurality of vents 29, located in wall 31 furthest from the operator, through hose vent screen 32, through hose 5, then through hose 30, into blower unit 10, through hose 9, into filter 8 of cyclone unit 7, into dust collector bag 12 of dust collector unit 6. Hose vent screen 32 located in front of wall 31, prevents any particles larger than dust size from entering hose 5. When full, the dust collector bag 12 is manually placed in the receiving container 33 to be recycled for its leaded glass content. Illumination of the crushing unit 14 is provided by light 24. The present method creates crushed leaded glass and dust, and stainless steel and nickel bearing components suitable for recycling in shipment ready containers, in a relatively dust free and safe environment.

I claim:

1. A method for dismantling cathode ray tubes, utilizing a device comprised of a dismantling unit, a crushing unit with a door, and fixed slotted floor and moveable ridged ceiling driven by hydraulic means, a filter unit with vacuum means, and a plurality of hoses connected to said crushing unit, dismantling unit and filter unit, through a plurality of vents, comprising the steps of:

manually placing a cathode ray tube, comprised of external, internal and surface components, on said dismantling unit, said external component comprising a mounting ring, said surface components comprising neck, funnel and face panel portions, and said internal components comprising gun and screen components;

manually dismantling said external mounting ring component from said cathode ray tube;

manually removing said external mounting ring component from said dismantling unit for recycling;

simultaneously during the above steps, collecting by said vacuum means, dust created during dismantling by vacuuming said dust through said plurality of vents and hoses into said filter unit, for recycling;

manually placing said cathode ray tube with said external mounting ring component removed on said floor of said crushing unit;

manually breaking said cathode ray tube at said neck and dismantling said internal gun component from said cathode ray tube;

manually removing said internal gun component from said crushing unit for recycling;

closing said door of said crushing unit to hydraulically move said ridged ceiling towards said slotted floor, whereby, in maximum position, said ridged ceiling and slotted floor fit into each other, thereby crushing remaining cathode ray tube components;

collecting said crushed funnel, neck and face panel components which fall through said fixed slotted floor into a container for recycling;

hydraulically moving said ridged ceiling to its original position, opening said door of said crushing unit to manually remove said internal screen component laying on said fixed slotted floor from said dismantling unit for recycling, and simultaneously during the above steps, collecting by vacuum means, dust created during crushing by vacuuming said dust through said plurality of vents and hoses into said filter unit, and then into a bag for recycling.

2. A method as described in claim 1, whereby said external mounting ring and internal screen components are comprised of steel.

3. A method as described in claim 1, whereby said dust collected is lead bearing.

4. A method as described in claim 1, whereby said internal screen component is comprised of nickel bearing steel.

5. A method as described in claim 1, whereby said surface components of the cathode ray tube, said neck, funnel and face panel components, are comprised of lead bearing glass.

6. A method as described in claim 1, whereby said hydraulic means is powered by electricity, which can be turned on or off by conventional switch means.

7. A method as described in claim 1, whereby said vacuum means is powered by electricity, which can be turned on and off by conventional switch means.

8. A method as described in claim 1, whereby a lever controls the hydraulic movement of said ridged ceiling.

9. A method as described in claim 1, whereby a hinged safety support device, comprising a hinge, support bar and chain, is hingedly attached to said door of said crushing unit, causing said safety support device to obstruct and stop said ridged ceiling from moving towards said slotted floor when said door is opened.

10. A method as described in claim 1, whereby a safety lock device, attached to said crushing unit's door, engages when said door is closed, and disengages when said door is open; thereby causing electrical circuit to be complete when said door is closed and be broken when said door is opened.

11. A method as described in claim 1, whereby said crushing unit and dismantling units are illuminated.

12. A device for performing the method of dismantling cathode ray tubes, said device comprising:

a dismantling unit for manually separating said external ring component from said cathode ray tube body;

a crushing unit with door;

a means for crushing said cathode ray tube in said crushing unit, said crushing means connected to said crushing unit;

a filter unit with vacuum means for collecting dust created during the method of the invention;

a plurality of hoses, said hoses connected between said crushing unit, dismantling unit and the filter unit through plurality of vents.

13. A device as described in claim 12, whereby said crushing means comprises a fixed slotted floor, and moveable ridged ceiling, which fit into each other at maximum crushing position, and which can be positioned to the original position by conventional lever device.

14. A device as described in claim 12, whereby said crushing means is driven by hydraulic means.

15. A device as described in claim 12, whereby said hydraulic means is powered by electricity, which can be turned on and off by conventional switch means.

16. A device as described in claim 12, whereby said vacuum means is powered by electricity, which can be turned on and off by conventional switch means.

17. A device as described in claim 12, whereby a hinged safety support device, comprising a hinge, support bar, and chain, is hingedly attached to said door of said crushing unit, causing said safety support device to obstruct and stop said ridged ceiling from moving towards said slotted floor when said door is opened.

18. A device as described in claim 12, whereby a safety lock device, attached to said crushing unit's door, engages when said door is closed, and disengages when said door is open; thereby causing electrical circuit to be complete when said door is closed and be broken when said door is opened.

19. A device as described in claim 12, whereby said crushing and dismantling units are illuminated by standard lighting devices.

\* \* \* \* \*